United States Patent [19]

Loving et al.

[11] Patent Number: 5,381,659
[45] Date of Patent: Jan. 17, 1995

[54] ENGINE EXHAUST REBURNER SYSTEM AND METHOD

[75] Inventors: Ronald E. Loving, Simi Valley; Gary D. James, Acton, both of Calif.

[73] Assignee: Hughes Aircraft Company, Los Angeles, Calif.

[21] Appl. No.: 45,334

[22] Filed: Apr. 6, 1993

[51] Int. Cl.$^6$ .................... F01N 3/26; F02B 37/00
[52] U.S. Cl. ........................ 60/280; 60/286; 60/303
[58] Field of Search .............. 60/274, 286, 301, 303, 60/280

[56] References Cited

U.S. PATENT DOCUMENTS

| | | | |
|---|---|---|---|
| 2,956,865 | 10/1960 | Williams | 60/303 |
| 3,306,035 | 2/1967 | Morrell | 60/286 |
| 3,370,914 | 2/1968 | Gross | 60/301 |
| 3,460,916 | 8/1969 | Aronsohn | 60/286 |
| 3,741,730 | 6/1973 | Alcott | 60/303 |
| 3,775,971 | 12/1973 | Gadefelt | 60/280 |
| 3,867,507 | 2/1975 | Myerson | 60/274 |
| 3,908,367 | 9/1975 | Bauman | 60/280 |
| 4,132,209 | 1/1979 | Resler | 60/274 |

Primary Examiner—Douglas Hart
Attorney, Agent, or Firm—W. K. Denson-Low

[57] ABSTRACT

An engine exhaust reburner system including an engine for generating exhaust gases and a reburner for igniting and decomposing the exhaust gases. The reburner includes a combustion chamber and an igniter which is provided for igniting an exhaust gas-air mixture in the combustion chamber. A decomposing channel is provided for extending the length of the combustion chamber to decompose the ignited mixture and to provide an output gas comprised of fundamental elements. A turbine, which passes through the decomposing channel, intercepts the output gas for performing useful work. In a preferred embodiment, the engine exhaust reburner system of the present invention includes an inlet manifold which receives engine exhaust gases from a smoothing tank and compressed air from a compressor to form an exhaust gas-air mixture. The mixture is forced into an insulated combustion chamber and, if necessary, combined with an injected combustible liquid fuel for ignition. The residue of the combusted mixture is thereafter forced into an insulated decomposing channel which extends the length of the combustion chamber to form a reaction region. The reaction region becomes sufficiently hot to ensure complete decomposition of any combustible exhaust gases in the mixture. Thereafter, a low polluting, hot pressurized output gas is intercepted by a turbine passing through the decomposing channel for rotating a shaft to drive the compressor.

1 Claim, 2 Drawing Sheets

ENGINE EXHAUST REBURNER SYSTEM AND METHOD

BACKGROUND OF THE INVENTION

1. Field of the Invention

The present invention relates to exhaust reburner systems. More specifically, the present invention relates to methods and apparatus for engine reburner systems that decompose pollutants in the exhaust of Otto cycle piston and rotary engines.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

The exhaust from piston and rotary engines contain pollutants that are created due to the inefficient burning process of hydrocarbon based fuels. Partially burned and unburned fuel is thereafter exhausted from the engine, through a muffler and into the atmosphere. Engines are often operated at low temperatures resulting in less than total combustion of all the fuel injected therein. Operation at temperatures insufficient for complete combustion ensures cooler operation and longer life of the engine. Cooler operation is accomplished by operating an engine fuel rich. Consequently, the air-fuel mixture does not contain sufficient oxygen for complete combustion. Although operating an engine at cooler temperatures can produce fewer Nitrogen/Oxygen compound ($NO_x$) pollutants, the hydrocarbon exhaust count increases dramatically.

Several methods have been employed in the past to reduce the pollutants exhausted from piston and rotary engines. One of these methods employs a particulate trap system in diesel engines to capture hydrocarbons and soot, e.g., carbons. The exhaust from the diesel engine feeds into a trap having at least one ceramic filter contained therein. The ceramic filter is housed within a metal container located at the end of an engine exhaust pipe. The function of the cermanic filter is to remove particulate matter from the exhaust gases.. Located between the ceramic filter and the engine exhaust pipe is a combustion chamber. The combustion chamber includes separate air and fuel input lines. Back pressure in the engine is monitored by an engine pressure sensor. An increase in engine back pressure indicates that the ceramic filter is becoming clogged with particulate matter.

In situations in which dual filter systems are utilized, an automatic transfer device senses the buildup of back pressure in the combustion chamber. The ceramic filters are then automatically switched. Thereafter, a suitable fuel is mixed with air in the proper proportions in the combustion chamber and then ignited. The heat generated in the combustion chamber is utilized to raise the temperature of the ceramic filters and to burn the trapped particulate. The ceramic filters trap and destroy approximately 80% of the soot and hydrocarbon particulate in the engine exhaust. Unfortunately, the carbon monoxide (CO) and $NO_x$ created by the engine and by the particulate trap system is released to the environment as pollutants.

Another method employed to reduce pollutants exhausted from piston and rotary engines employs a catalytic converter. A catalytic converter is typically located within the exhaust line between the exhaust manifold and the muffler of an automobile. It is noted that a catalytic converter cannot be utilized in conjunction with a diesel engine as the dense diesel exhaust mixture of particulate and unburned fuel clogs the catalytic material. Catalytic converters employed with gasoline engines often utilize platinum as the catalytic material. The platinum is extruded into the shape of bundled wires. The extruded platinum chemically reacts with the particulate matter reducing the carbons and hydrocarbons to the base elements of carbon, hydrogen and oxygen. Unfortunately, the extruded platinum is generally inefficient and does not destroy all of the pollutants. Thus, those pollutants exiting the catalytic converter are exhausted to the atmosphere. Further, platinum is very expensive and thus not economical for use in catalytic converter systems.

An example of a method to reduce the level of pollutants exhausted to the atmosphere utilizes an incinerator employed for destroying hazardous and toxic waste on a large scale. The incinerator includes a cylindrical combustion chamber joined by a flat circular plate to a smaller inlet pipe. Fuel nozzles protrude through the flat plate into the combustion chamber. Air and fuel are not premixed but rather are injected into the combustion chamber at the point of flame stabilization. Sudden expansion of air between the inlet pipe and combustion chamber provides the effect of a flame holder. Combustion of the fuel occurs and low ($NO_x$) levels are produced. Recirculation of the gas and air mixture is employed to ensure total combustion. The heat generated by the combustion is released to the atmosphere through a long hot exhaust tube that completes the decomposition of the hydrocarbon and carbon molecules.

In another example, an incinerator comprises a concentric elongated tubular array with an outer closed tubular housing and an annular tubular heat exchanger in the form of a bundle of spaced open-ended tubes inside the housing. The annular tubular heat exchanger cooperates with a combustion chamber that receives a fuel line, a fluidized waste material line and an ignition system along with a source of heated air. Although each of the incinerators is useful for very large scale destruction of toxic and carcinogenic materials, it is completely impractical for use in reburning the exhaust of piston and rotary engines. Various large scale incinerator devices for destroying hazardous waste are known and by way of example, several embodiments of such devices can be found in U.S. Pat. Nos. 3,074,469, 4,785,748 and 4,915,038.

In a final example, an exhaust gas after-burning system for reducing vehicle air pollution is known. The system includes a reactor for re-oxidizing the unburned components of engine exhaust gases such as hydrocarbons and carbon monoxides. A fuel supply unit and an air supply unit are incorporated in the system for supplying secondary fuel and air, respectively, in controlled quantities to the reactor. The secondary fuel and air supplied to the reactor vary with the engine load. The combustible mixture of the secondary fuel and air is ignited within the reactor by an ignition plug so that the unburned gases of the exhaust are reburned. The fuel supply unit utilizes a check valve to control the flow of fuel to the reactor. The engine exhaust gases and the supplied air are not premixed but are delivered to the inner combustion chamber from opposite ends thereof. Only the combustible air-fuel mixture is directly exposed to the region of the ignition plug. Thus, the efficiency of combustion of the unburned components of the engine exhaust gases is suppressed. An example of an exhaust gas after-burning system for reducing vehicle air pollution can be found in U.S. Pat. No. 3,750,401.

Thus, there is a need in the art for improvements in engine exhaust reburner systems to eliminate the pollutants exhausted from Otto cycle piston and rotary engines.

SUMMARY OF THE INVENTION

The need in the art is addressed by the engine exhaust reburner system and method of the present invention. The invention includes an engine for generating exhaust gases and a reburner for igniting and decomposing the exhaust gases. The reburner includes a combustion chamber and an igniter which is provided for igniting an exhaust gas-air mixture in the combustion chamber. A decomposing channel is provided for extending the length of the combustion chamber to decompose the ignited mixture and to provide an output gas comprised of fundamental elements. A turbine which passes through the decomposing channel intercepts the output gas for performing useful work.

In a preferred embodiment, the engine exhaust reburner system of the present invention includes an inlet manifold which receives engine exhaust gases from a smoothing tank and compressed air from a compressor to form an exhaust gas-air mixture. The mixture is forced into an insulated combustion chamber and, if necessary, combined with an injected combustible liquid fuel for ignition. The residue of the combusted mixture is thereafter forced into an insulated decomposing channel which extends the length of the combustion chamber to form a reaction region. The reaction region becomes sufficiently hot to ensure complete decomposition of any combustible exhaust gases in the mixture. Thereafter, a low polluting, hot pressurized output gas is intercepted by a turbine passing through the decomposing channel for rotating a shaft to drive the compressor.

DESCRIPTION OF THE INVENTION

Figure 1:
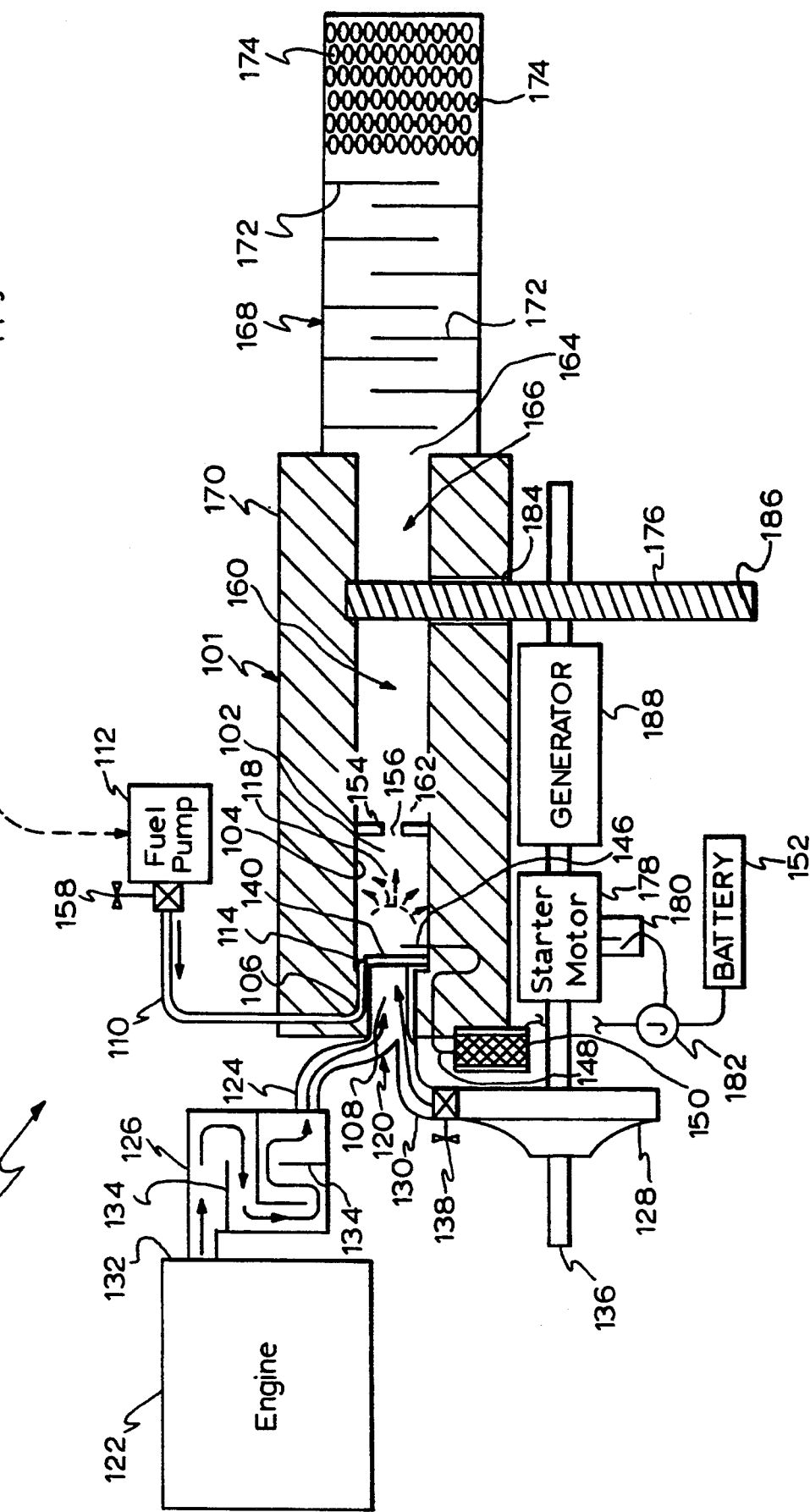
FIG. 1 is a simplified side elevational view, partly in block and partly in section, of the engine exhaust reburner system of the present invention showing a combustion chamber and decomposing channel used to reduce exhausted pollutants to basic elements.
Figure 2:
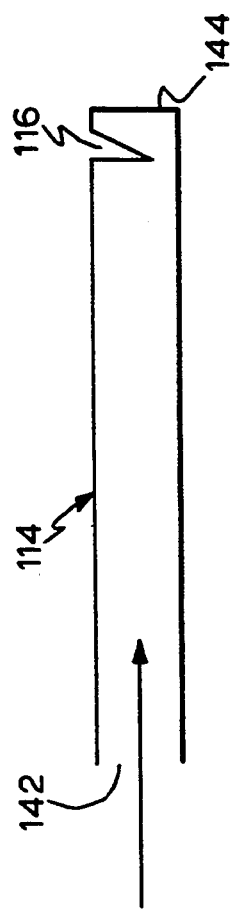
FIG. 2 is a simplified elevational view of a fuel injector pipe used in the engine exhaust reburner system of FIG. 1 showing a slotted end for misting the fuel.

The invention is an engine exhaust reburner system 100 as shown in FIG. 1. The reburner system 100 comprises a reburner 101 which includes an open-ended combustion chamber 102 having no moving parts. The combustion chamber 102 preferably employed in the present invention is cylindrical and bounded by an outer wall 104 as shown in FIG. 1. A first cylindrical input port 106 and a second cylindrical input port 108 are formed in the forward end of the outer wall 104. The first cylindrical input port 106 accommodates a fuel feed line 110 for carrying a combustible hydrocarbon based fuel. The fuel is fed from a fuel source (not shown) through the fuel feed line 110 by conventional methods such as, for example, by a fuel pump 112 shown in FIG. 1. The fuel feed line 110 terminates in a plurality of fuel injectors 114 attached to the end of the fuel feed line 110. Each injector 114 has a slot 116 formed in the body thereof as shown in FIG. 2 for atomizing the fuel delivered to an ignition region 118 within the combustion chamber 102. The small fuel droplets caused by atomizing the combustible fuel with the fuel injectors 114 results in higher efficiency ignition of cheaper fuels that are otherwise difficult to burn.

The second cylindrical input port 108 accommodates an inlet manifold 120 of the reburner 101. The inlet manifold 120 serves as an inlet port to the combustion chamber 102 for compressed air and engine exhaust gases. The engine exhaust gases are expelled from an engine 122 which can be a piston or rotary engine or other source of exhaust gases containing pollutants. The engine exhaust gases containing the pollutants are carried to the inlet manifold 120 by an exhaust inlet pipe 124 via a smoothing tank 126. The compressed air received at the inlet manifold 120 is supplied by an air compressor 128 via a compressed air inlet line 130 as shown in FIG. 1. The inlet manifold 120 is a premixer manifold in which the exhaust inlet pipe 124 and the compressed air inlet line 130 are merged at the forward end of the reburner 101 to form a single line. The compressed air and exhaust gases are mixed in the inlet manifold 120 and thereafter directed to the combustion chamber 102.

The operation of the piston engine 122 results in periodic spikes of high pressure gas being exhausted from an engine exhaust manifold 132. The smoothing tank 126 is utilized to remove the periodic spikes or pulsations in the gases exhausted from the piston engine 122. By removing the periodic spikes or pulsations from the exhaust gases, the reburner 101 functions more efficiently. In general, the smoothing tank 126 is constructed of a metal that can withstand the pressure and heat of the engine 122. A suitable metal can be thick sheet metal which can be fashioned in a square or cylindrical shape to satisfy space economy requirements. The smoothing tank 126 can be directly connected between the output line of the engine exhaust manifold 132 and the exhaust inlet pipe 124. Standard mounting hardware known in the art can be utilized for the connections.

The interior of the smoothing tank 126 is constructed to include a serpentine or tortuous path. This is accomplished by constructing within the smoothing tank 126 a plurality of baffle plates 134. The baffle plates 134 force the pressurized engine exhaust gases to change directions several times while passing through the smoothing tank 126. Much of the energy exhibited by the periodic spikes or pulsations in the exhaust gases is dissipated by being forced through the winding path created by the baffle plates 134. Thus, the engine exhaust gases delivered to the exhaust inlet pipe 124 are smoothed to provide a more even distribution of exhaust pressure which improves the efficiency of the reburner system 100. If the engine 122 is of the type that expels engine gases that do not include periodic spikes or pulsations, the smoothing tank 126 can be eliminated.

The air compressor 128 provides high energy compressed air to the ignition region 118 of the combustion chamber 102. The compressed air serves as an oxidizer to sustain the reburning of the engine exhaust gases as described in more detail hereinbelow. The compressor 128 can be one of several varieties known in the art such as, for example, a centrifugal or axial flow type. In the preferred embodiment of the engine exhaust reburner system 100 shown in FIG. 1, the air compressor 128 is preferably a centrifugal outflow compressor. The centrifugal outflow compressor 128 exhibits a design in which the input air is drawn from around the axial center of the compressor and forced to the outer edge of the compressor housing. Thus, the air output is radial. A steady stream of pressurized air is formed and directed to the intake manifold 120 via the air inlet line 130.

The air compressor 128 can be mounted on and driven by a turbine drive shaft 136 operated by an impulse turbine wheel 176 as shown in FIG. 1. At initial engine start-up, a high speed D.C. starter motor 178 is utilized to rotate the turbine drive shaft 136. Rotation of the turbine drive shaft 136 drives the compressor 128 to provide the pressurized air to the combustion chamber 102 until the impulse turbine wheel 176 is up to speed. The D.C. starter motor 178 is energized by and connected to a battery 152 via a motor switch 180 and a junction box 182 as symbolized in FIG. 1. The normally-open motor switch 180 is designed to close when energized and to rotate the turbine drive shaft 136 within the range of (10K-to-20K) RPM. When the impulse turbine wheel 176 is rotated at a speed beyond this range due to gas pressure developed from combustion within chamber 102, the motor switch 180 will open circuit. A suitable switch for this application is, for example, a centrifugal switch.

By utilizing the starter motor 178, the compressor 128 can provide ambient air to the combustion chamber 102. The output air pressure developed by the compressor 128 should be approximately equal to the exhaust gas pressure at the output of the smoothing tank 126 to prevent backfeeding of air into the smoothing tank 126 or backfeeding of engine exhaust gases into the air compressor 128. However, the compressed air inlet line 130 can include a gate control valve 138 to ensure the prevention of backfeeding of the exhaust gas into the air compressor 128 as shown in FIG. 1.

Figure 3:
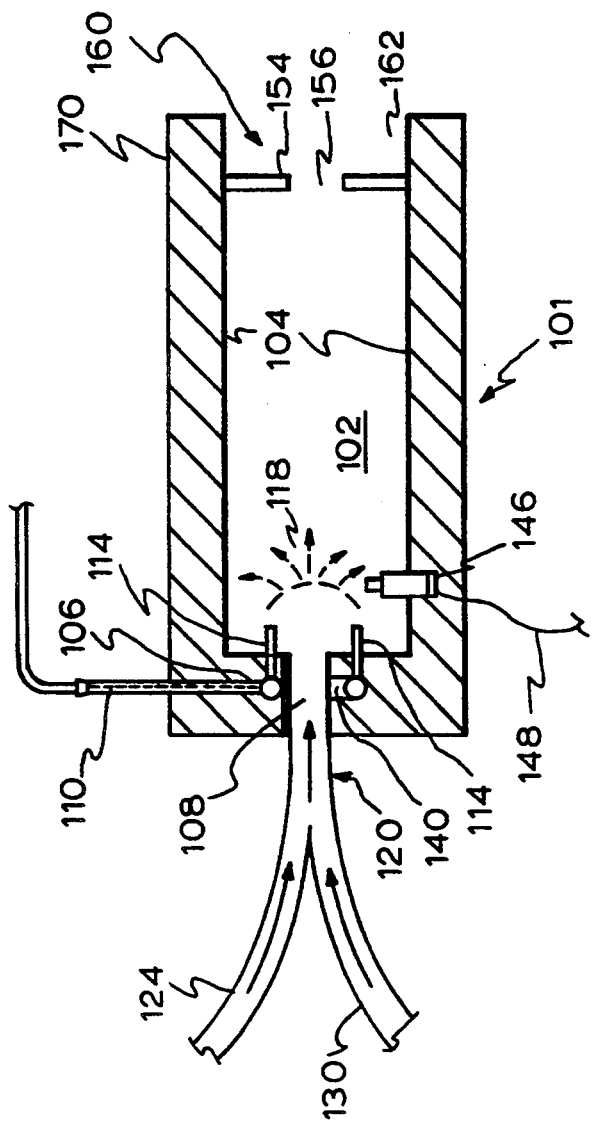
FIG. 3 is a partial cross-sectional view of the engine exhaust reburner system of FIG. 1 showing the fuel line and injectors and the combustion chamber in more detail.

The external fuel pump 112 feeds a hydrocarbon based combustible liquid fuel through the fuel feel line 110 to a fuel injector manifold 140 as shown in FIGS. 1 and 3. The fuel injector manifold 140 serves to support the mounting of the plurality of fuel injectors 114. The fuel injector manifold 140 is connected directly to the end of the fuel feed line 110 as shown in FIG. 3. The manifold 140 includes a central body having a plurality of ports for passing the liquid fuel outward to the fuel injectors 114. Each fuel injector 114 is comprised of a small pipe mounted in the fuel injector manifold 140. A first end 142 of each fuel injector pipe 114 is open and serves as an intake end for receiving the combustible liquid fuel. A second end 144 of each injector pipe 114 is closed as shown in FIG. 2 so that pressure accumulates in the pipe. The small thin slot 116 formed in the body of each fuel injector 114 ensures the escape of the combustible liquid fuel therefrom. The slot 116 is small enough to atomize or mist the fuel escaping into the combustion chamber 102 which increases the probability of ignition of the fuel within the ignition region 118.

Introduction of the compressed air from the compressed air inlet line 130, the engine exhaust gases from the exhaust inlet pipe 124 and the combustible liquid fuel from the fuel feed line 110 creates an exhaust gas-air mixture in the ignition region 118 of the combustion chamber 102. The exhaust gas-air mixture is comprised of the proper proportions of the constituent elements of the mixture, including the combustible fuel if needed, to burn when exposed to an ignition device. Mounted within the outer wall 104 of the cylindrical combustion chamber 102 is an igniter 146 shown best in FIG. 3. The igniter 146 extends into the combustion chamber 102 and functions to ignite the exhaust gas-air mixture within the ignition region 118. The burning of the exhaust gas-air mixture serves to reburn the engine exhaust gases including the pollutants included therein.

The igniter 146 can be one of several devices depending upon the hydrocarbon based fuel utilized in the reburner 101. For example, if a lightweight fuel such as natural gas, butane, propane or gasoline is employed, the igniter 146 can be a spark plug. For lightweight fuels, the spark plug is energized during the start-up period and can be deenergized when the reburner 101 is normally operating. If a heavier fuel such as diesel is utilized, a spark plug continues to be the preferred igniter device in the present invention. However, a glow plug can also be employed as the igniter 146. A glow plug incorporates a platinum wire that is constantly energized and glows white hot to ensure combustion of the exhaust gas-air mixture. The igniter 146 is connected to an electrical lead 148 which is circuited to a spark generating device as shown in FIGS. 1 and 3.

In the preferred embodiment, the spark generating device is a high voltage coil 150 which is employed to provide sufficient amperage within a specified voltage range to generate a spark that will jump the gap of the igniter spark plug 146. The high voltage coil 150 is energized by the battery 152 via the junction box 182 as shown in FIG. 1. An example of a high voltage coil 150 suitable for use in the reburner 101 is an electronic device that receives a low voltage A.C. square wave input pulse and generates a higher voltage A.C. square wave output pulse. In the alternative, a magneto (not shown) can be employed that is driven directly by the turbine drive shaft 136 shown in FIG. 1.

The reburning of the engine exhaust gases occurs in the open-ended combustion chamber 102. The combustion chamber 102 is bounded by the outer wall 104 and can be fashioned from, for example, a nickel-steel alloy or stainless steel or known ceramic materials depending upon the temperature of operation. The exhaust gases expelled from the engine 122 include unburned fuel droplets which exist because of incomplete combustion. In order to reburn the unburned fuel droplets expelled from engine 122, the combustion chamber 102 must be heated before any catalytic reaction can occur. To accomplish this, the fuel injectors 114 are positioned in juxtaposition to the ignition region 118 and the igniter 146 serves to ignite the exhaust gas-air mixture. The unburned fuel droplets within the exhaust gases are ignited. If the concentration of unburned fuel droplets is sufficiently high, the ignition of the exhaust gas-air mixture will be self-sustaining.

If the concentration of the unburned fuel droplets within the exhaust gases is insufficient, the ignition will not be self-sustaining. Under these conditions, fuel is provided, as necessary, by the fuel pump 112 via the fuel feed line 110. In the preferred embodiment of the present invention, the fuel pump 112, the air compressor 128 and the igniter 146 can be continuously controlled by a controller (not shown) that senses the temperature of the combustion chamber 102 and the RPM of the engine 122. Thereafter, control signals are generated and transmitted to the fuel pump 112, the air compressor 128 and the igniter 146 to control the operation thereof.

The reburning of the exhaust gas-air mixture in the ignition region 118 of the combustion chamber 102 results in the creation of hot pressurized gases which includes pollutants. The hot pressurized gases are forced to travel to the end of the combustion chamber 102 opposite the second cylindrical input port 108 by the expansion of the compressed air in the exhaust gas-air mixture. Located at the end of the combustion chamber 102 is an air-flow turbulator 154 as shown in FIG. 1. The turbulator 154 exhibits a construction similar to a washer or disk having a center penetration 156 formed therethrough. The turbulator 154 is positioned across the width of the combustion chamber 102 and serves to generate turbulence in the hot pressurized gases. The materials utilized to construct the turbulator 154 are the same as those employed to build the combustion chamber 102. The range of materials extends from stainless steel or a nickel-steel alloy to known ceramics depending upon the intended temperature of operation.

The flow of the hot pressurized gases through the combustion chamber 102 is interrupted by the turbulator 154. That portion of the hot pressurized gases not passing through the center penetration 156 of the turbulator 154 is temporarily delayed from exiting the combustion chamber 102. The delayed gases are forced to recirculate back into the ignition region 118 of the combustion chamber 102. Further exposure of the hot pressurized gases to the ignition region 118 ensures complete combustion of the exhaust gas-air mixture. The distance between the fuel injectors 114 at the end of the fuel feed line 110 and the turbulator 154 must be a straight line as shown in FIGS. 1 and 3 to ensure proper recirculation and complete combustion of the burning gases. The ignition region 118 extends from the fuel injectors 114 to the turbulator 154.

The exhaust gases and pollutants within the ignition region 118 are under pressure due to the compressor 128. Further, the reburning of the exhaust gases and pollutants generates pressure due to the expansion of the burning gases. If the pressure is sufficiently high within the combustion chamber 102, backfeeding of hot pressurized products of combustion into the fuel feed line 110 is possible. In order to prevent backfeeding of hot pressurized gases from the ignition region 118 to the fuel pump 112, a gate control valve 158 is positioned in the fuel feed line 110.

The combustion chamber 102 further includes an extension 160 best shown in FIG. 1. In the present invention, the extension 160 can be of straight cylindrical or tubular construction and is connected directly to the end of the combustion chamber 102. However, the extension 160 can also assume other shapes such as curved or folded. The extension 160 should be constructed of the same material as the combustion chamber 102. This design ensures the maximum heat transfer from the combustion chamber 102 to the extension 160. In the preferred embodiment, the material of choice for the extension 160 is stainless steel. In practice, the extension 160 can be integrally formed with the combustion chamber 102 and thus is also bounded by the outer wall 104. Other suitable methods of connecting the extension 160 to the combustion chamber 102 can also be utilized.

The extension 160 includes an input end 162 and an exhaust end 164. The input end 162 receives the hot pressurized gases forcibly repositioned from the ignition region 118 and through the turbulator 154 by the compressed air. The input end 162 leads directly into a main tubular chamber 166 of the extension 160. All products of combustion generated by reburning the engine exhaust gases must pass through the extension 160. The exhaust end 164 of the extension 160 leads directly into a muffler 168 as shown in FIG. 1. The muffler 168 thereafter vents a very low polluting exhaust gas to atmosphere.

The function of the extension 160 is to extend the combustion chamber 102 for decomposing the products of combustion created as a result of reburning the engine exhaust gases in the presence of air and, if needed, the combustible liquid fuel, e.g., the exhaust gas-air mixture. Thus, in the preferred embodiment, the extension 160 is referred to as a decomposing channel. The extension or decomposing channel 160 can be two-to-ten times the length of the combustion chamber 102. The extended length of the decomposing channel 160 ensures sufficient time for the decomposition of any hydrocarbon pollutants present in the products of combustion. The decomposing channel 160 effectively lengthens the combustion chamber 102. The length of the decomposing channel 160 is dependent upon the dimensions of the combustion chamber 102 and on the type of fuel utilized. By effectively lengthening the combustion chamber 102 and by reusing the heat generated by the combustion, total reburning of the exhaust gas-air mixture and any hydrocarbon pollutants created thereby is ensured. Lengthening the combustion chamber 102 via the decomposing channel 160 also prevents ignition termination (e.g., flame out) since the reburning can take place anywhere along the length of the decomposing channel 160.

The decomposing channel 160 is fabricated to provide a continuous pathway from the combustion chamber 102 to the muffler 168. The continuous pathway is provided between the input end 162 and the exhaust end 164 to ensure that the combustion chamber 102 is open-ended for the passage of the hot pressurized gases therethrough. The hot pressurized gases that pass into the decomposing channel 160 saturate the outer wall 104 thereof. Thus, the temperature of the decomposing channel 160 is raised to approximately that of the combustion chamber 102. The decomposing channel 160 becomes sufficiently hot to decompose and reduce the products of combustion to the fundamental elements of carbon, hydrogen and oxygen.

Surrounding both the combustion chamber 102 and the decomposing channel 160 is an insulated jacket 170 as shown in FIGS. 1 and 3. The insulated jacket 170 is an outer wall of insulation which serves to prevent the loss of heat generated by the combustion within the chamber 102. Thus, the heat generated by combustion is efficiently transferred to the decomposing channel 160. By containing heat normally dissipated to the environment, the efficiency of combustion in the chamber 102 is improved. The insulated jacket 170 is comprised of any suitable material for preventing the flow of heat past the outer wall 104 of the combustion chamber 102. An example of a suitable material for the insulated jacket 170 is porous ceramic of the type having a bubble construction that insulates heat.

The decomposing channel 160 forms a "reaction region" within the main chamber 166 and is connected to the muffler 168 at the extension exhaust end 164 in a manner known in the art as shown in FIG. 1. The reaction region within the main chamber 166 extends from the input end 162 to the exhaust end 164 of the decomposing channel 160. The hydrocarbon pollutants created in the ignition region 118 are either burned and disintegrated or are forced to decompose to the base elements in the reaction region of the main chamber 166 due to the presence of the heat and oxygen. Thus, the decomposing channel 160 functioning as a reaction region expels very low polluting gases to the muffler 168 as shown in FIG. 1. The very low polluting gases are thereafter directed to the atmosphere. Further, the reaction region of the main chamber 166 enables the use of a very lean exhaust gas-air and fuel mixture which improves the efficiency of operation.

In the preferred embodiment, the combustion chamber 102 and the decomposing channel 160 can be of unitary construction as shown in FIG. 1. However, other known means of connecting the combustion chamber 102 and the decomposing channel 160 can be utilized. Additionally, the combustion chamber 102, the decomposing channel 160 and any associated structure should be comprised of duplicate material, e.g., either a nickel-based alloy, stainless steel or ceramic. Likewise, the muffler 168 and structure associated therewith are formed from material that is consistent with the material comprising the combustion chamber 102. The combustion chamber 102 and the associated decomposing channel 160 can be designed to withstand temperatures in excess of 3000° Fahrenheit. The nickel-steel based alloy can be used for applications to 2000° Fahrenheit while ceramic can be utilized for applications at higher temperatures. In general, the nickel-steel based alloy construction is employed for lower temperature operations while the ceramic construction is utilized for higher temperature operations.

Penetrating the insulated jacket 170 and extending across the decomposing channel 160 is the impulse turbine wheel 176 as shown in FIGS. 1. A set of appropriate sealing devices 184 known in the art is employed to seal the interface between the insulated jacket 170, the decomposing channel 160 and the turbine wheel 176. The turbine wheel 176 is shown mounted on the turbine drive shaft 136. Thus, rotation of the turbine wheel 176 turns the drive shaft 136. Likewise, during start-up, rotation of the drive shaft 136 by the high speed D.C. starter motor 178 turns the turbine wheel 176. The impulse turbine wheel 176 can be any suitable single or multiple stage turbine device known in the art.

In the present invention, the turbine wheel 176 is positioned in the path of the hot pressurized gases traveling through the decomposing channel 160. The hot pressurized gases, which are normally vented to atmosphere through the muffler 168, strike a plurality of individual turbine blades 186. The kinetic energy exhibited by the hot pressurized gases is transferred to the individual turbine blades 186. The summation of the energy transferred to the individual turbine blades 186 results in the rotation of the turbine wheel 176. The continued operation of the combustion chamber 102 sustains the rotation of the turbine wheel 176 even at low speeds of the engine 122.

Rotation of the turbine wheel 176 drives the turbine drive shaft 136 in a ratio of 1:1. Rotation of the drive shaft 136 results in rotation of the air compressor 128. Rotation of the air compressor 128 causes compressed air to be delivered to the inlet manifold 120. The compressed air is utilized to support combustion within the combustion chamber 102. The rotating drive shaft 136 also drives the D.C. starter motor 178 and an auxiliary generator 188. When the normally open switch 180 is open circuited, the armature coil of the D.C. starter motor 178 will spin with the drive shaft 136 without any consequences. The auxiliary generator 188 can be an A.C. or D.C. generator or a D.C. generator adapted to provide A.C. voltage. Rotation of the auxiliary generator 188 provides electrical potential to energize a plurality of electrical loads. Examples of the electrical loads include the water pump, air conditioning equipment and radiator fan of the engine 122 shown in FIG. 1.

The reburning of the exhaust gas-air mixture in the combustion chamber 102 and the decomposing channel 160 generates noise. The noise is produced, in part, by the expansion of the hot pressurized gases. Much of the energy exhibited by the hot pressurized gases is dissipated in the interaction with the turbine blades 186. Notwithstanding, the muffler 168 is provided as shown in FIG. 1 to reduce the noise level. The muffler 168 includes a plurality of baffle plates 172 for dissipating the remaining energy existing within the exhaust gases. Several stages of baffle plates 172 are employed to reduce the energy of the exhaust gases and the noise to an acceptable level. The depleted exhaust gases are then vented through a plurality of exhaust holes 174 which serve as an exhaust pipe.

During operation, the engine exhaust reburner system 100 functions in the following manner. After being started, the engine 122 expels exhaust gases containing pollutants to the smoothing tank 126 which serves to remove the spikes and pulsations from the exhaust gases. The smoothed exhaust gases are then discharged to the inlet manifold 120 via the exhaust inlet pipe 124. During start-up, the starter motor switch 180 is closed connecting the battery 152 to the D.C. starter motor 178. The D.C. starter motor 178 rotates the turbine drive shaft 136 and thus the air compressor 128. The air compressor 128 delivers compressed ambient air to the inlet manifold 120 via the compressed air inlet line 130. The combination of the engine exhaust gases and the compressed air form the exhaust gas-air mixture which is delivered to the combustion chamber 102 through the inlet manifold 120.

The exhaust gas-air mixture enters the combustion chamber 102 and is exposed to the igniter 146. When there is insufficient fuel to initiate or sustain burning of the exhaust gas-air mixture in the combustion chamber 102, combustible liquid fuel is forced through the fuel feed line 110 by the fuel pump 112. The fuel is delivered to the combustion chamber 102 in a fine mist by the fuel injectors 114. The exhaust gas-air mixture is mixed with the atomized combustible fuel in the combustion chamber 102 to form a combustible mixture. The combustible mixture is then ignited by the igniter 146 resulting in combustion within the ignition region 118 of the combustion chamber 102. The fuel droplets provided by atomizing or misting the combustible fuel by the fuel injectors 114 results in higher efficiency ignition. The exhaust gas-air mixture burns and generates hot expanding gases. The pressure of the hot expanding gases is derived from the pressure of the compressed air and the expansion of the air when the fuel is combusted.

As the present combustion of the exhaust gas-air mixture occurs in the combustion chamber 102, the gases from the immediate previous combustion will be forced toward the reaction region within the decomposing channel 160 by the pressure of the expanding gases. A portion of the hot pressurized gases from the ignition region 118 pass into the input end 162 of the decomposing channel 160. That portion of the hot pressurized gases not passing into the input end 162 of the decomposing channel 160 is temporarily delayed from exiting the ignition region 118. The delayed gases are redirected to the ignition region 118 to ensure complete combustion of the exhaust gas-air mixture. The portion of the hot expanding gases passing into the decomposing channel 60 travel into the main chamber 166. The cylindrical or tubular walls of the decomposing channel 160 become superheated when saturated by the heat from the hot gases. This condition maintains the internal temperature of the combustion chamber 102 sufficiently high to sustain the combustion cycle. The superheated walls of the decomposing channel 160 ensure complete combustion or decomposition of the engine exhaust gases and any residual pollutants.

The hot pressurized gases traveling through the decomposing channel 160 are then intercepted by the turbine blades 186 of the impulse turbine wheel 176. The turbine wheel 176 is caused to rotate which turns the turbine drive shaft 136. When the speed of the drive shaft 136 exceeds a predetermined range, the motor switch 180 is open circuited and the air compressor 128 is driven due to the rotation of the turbine wheel 176 caused by the combustion within chamber 102. Additionally, the auxiliary generator 188 provides electrical potential to operate a plurality of loads associated with the engine 122. Thereafter, the dissipated exhaust gases are discharged to the muffler 168. The gases exhausted from the muffler 168 are, therefore, very nearly pollution free and can be safely expelled to the atmosphere.

The combustion chamber 102 of the engine exhaust reburner system 100 should not exceed 1700° Fahrenheit (F) and, in practice, is operated at approximately 1650° F or lower. The exhaust gases are therefore within the low-to-medium temperature range while the pressure of the exhaust gases is within the low-to-medium pressure range (e.g., up to 100 PSI). This temperature range has been selected to ensure complete combustion of the exhaust gas-air mixture while minimizing the production of nitrogen/oxygen compounds ($NO_x$). Operating temperatures above 2000° F. result in the production of higher nitrogen/oxygen compound ($NO_x$) levels. By operating the combustion chamber 102 in the selected temperature range, the hydrocarbons in the exhaust gas-air mixture will be completely combusted or decomposed to basic pollution free elements such as carbon, hydrogen and oxygen. Almost total combustion of the exhaust gas-air mixture occurs in the combustion chamber 102. Any hydrocarbon particles escaping from the combustion chamber 102 will be consumed within the reaction region of the decomposing channel 160. Therefore, the combustion chamber 102 replaces the catalytic converter of the prior art in the selected temperature range.

Any inexpensive fuel can be used in the combustion chamber 102 including diesel, kerosene, gasoline, JP fuels and natural gas. By atomizing the combustible fuel in the fuel injectors 114, cheaper fuels that are otherwise difficult to burn can be utilized. By varying the proportions of the engine exhaust gases, the compressed air and the combustible fuel, the proper exhaust gas-air mixture can be determined to ensure total combustion thereof. Total combustion means that all the energy in the exhaust gas-air mixture has been utilized. Each individual fuel utilized will require an adjustment of the proportion of the fuel to be mixed with the compressed air and exhaust gases. After the correct exhaust gas-air mixture is achieved, less fuel will be necessary to sustain the combustion of the exhaust gases expelled from the engine 122.

Thus, the present invention has been described herein with reference to a particular embodiment for a particular application. Those having ordinary skill in the art and access to the present teachings will recognize additional modifications, applications and embodiments within the scope thereof. Although the detailed description is directed to an engine exhaust reburner system for Otto type piston and rotary engines, the present invention is equally applicable to other systems and devices that exhaust gases containing pollutants.

It is therefore intended by the appended claims to cover any and all such modifications, applications and embodiments within the scope of the present invention.

Accordingly,

What is claimed is:

1. An engine exhaust reburner system for reburning exhaust gases from an engine, comprising:

a smoothing tank for receiving the exhaust gases and for providing smoothed exhaust gases;

a cylindrical combustion chamber having a first end and a second end opposite said first end;

manifold means for mixing a volume of air with said smoothed exhaust gases and for delivering an exhaust gas-air mixture to said first end of said combustion chamber;

igniting means for igniting said exhaust gas-air mixture;

a turbulator located at said second end of said cylindrical combustion chamber, said turbulator comprised of a flat disk having a central opening;

a cylindrical decomposition chamber extending from said end of said cylindrical combustion chamber, said cylindrical decomposition chamber having a length that is 2 to 10 times the length of said cylindrical combustion chamber;

insulating means surrounding said cylindrical combustion chamber and said cylindrical decomposition chamber; and turbine means extending into said cylindrical decomposition chamber for performing useful work.

* * * * *